UNITED STATES PATENT OFFICE.

WILLIAM F. DOERFLINGER, OF BROOKLYN, NEW YORK, ASSIGNOR OF ONE-HALF TO THE PERRY-AUSTEN MANUFACTURING COMPANY, OF GRASSMERE, NEW YORK, A CORPORATION OF NEW YORK.

ORGANIC COMPOUND AND PROCESS OF MAKING THE SAME.

1,003,438. Specification of Letters Patent. Patented Sept. 19, 1911.

No Drawing. Application filed May 16, 1910. Serial No. 561,773.

*To all whom it may concern:*

Be it known that I, WILLIAM F. DOERFLINGER, a citizen of the United States, residing at Brooklyn, in the county of Kings and State of New York, have invented certain new and useful Improvements in Organic Compounds and Processes of Making the Same, of which the following is a specification.

This invention relates to a certain novel organic compound and the process of making the same and its novelty consists in the several successive steps of the said process and the novel product resulting therefrom.

Solutions of nitrocellulose are extensively used for the manufacture of collodion, lacquers, for waterproofing and surfacing and other industrial purposes. The solvents chiefly employed for this purpose are aceton, ethers and amyl acetate.

My present invention relates to the manufacture of similar and in many respects better products by using as a raw material fatty acid esters of cellulose such as acetyl cellulose, whereby a product is obtained which is suitable as a waterproof coating for the impregnation of various materials, and has a high insulating power. The number of solvents for this group of bodies is however limited. Those heretofore used are principally chloroform, aceton and acetylenetetrachlorid.

I have found that diaceton alcohol is a new solvent for such fatty acid esters similar to acetyl cellulose having certain advantages. Diaceton alcohol is the substance sometimes known as 4-hydroxy-2-keto 4 methyl pentan. Its formula is believed to be

$$CH_3.CO.CH_2.C(CH_3)_2OH.$$

Its specific gravity is about .93 at 25° C. It is miscible with water, alcohol and ether in all proportions. It may be separated from its aqueous solution by caustic potash or caustic soda. It boils at about 163 degrees centigrade, dissolves acetyl cellulose slowly at ordinary temperature and more rapidly on warming, and the resulting solutions are easy to manipulate and they dry to transparent films. If diaceton alcohol is used alone the solutions dry rather slowly. It may be used alone or in conjunction with suitable diluents. The diluents may be liquids which alone are solvents of acetyl cellulose or which alone are nonsolvents thereof. The amount of diluent to be used depends upon its nature and the purpose for which the solution is to be used and can be readily determined by experiment. For instance, 3 parts of diaceton alcohol mixed with one part of benzol makes a good solvent and the evaporation of an acetyl cellulose in it leaves a transparent film. The admixture of a little diaceton alcohol in aceton makes another good solvent which flows and brushes much better than a solution of acetyl cellulose in aceton alone. Diaceton alcohol is also a solvent for nitrocellulose and compound solutions of nitrocellulose and cellulose acetate may be prepared by the use of this new solvent either alone or mixed with suitable diluents.

The solutions of acetyl cellulose and of acetyl cellulose and nitrocellulose in liquids comprising diaceton alcohol may be used for the manufacture of filaments, or threads, by causing such solutions to pass from suitably shaped orifices or molds into fixing liquids in the well known manner. Films, sheets and other objects may be produced by causing a layer of the solution to evaporate. The filaments and films produced from acetyl cellulose and nitrocellulose together are more adherent and stronger than those produced from acetyl cellulose alone and less inflammable and have a higher insulating power than nitrocellulose films. They are also more resistant to alkalis. I believe the solution of cellulose acetate and nitrocellulose in liquids comprising diaceton alcohol are better adapted for the preparation of such compound films, etc., than any heretofore known.

The solutions of organic fatty acid esters of cellulose such as acetyl cellulose in solvents comprising diaceton alcohol with or without the addition of nitrocellulose, resins, oils, etc., may be advantageously used as lacquers or varnishes. The diaceton alcohol need not be highly purified but may be used mixed with the various substances such as aceton, mesityl oxid, etc., which may occur with it in its crude state.

As an example of our process one pound of acetyl cellulose is brought together with nineteen pounds of diaceton alcohol in a suitable vessel and agitated until solution is complete.

What I claim as new is:—

1. As a new composition of matter, a solution of acetyl cellulose comprising acetyl cellulose, diaceton alcohol and aceton.

2. The composition of matter comprising diaceton alcohol, dissolved acetyl cellulose and nitrocellulose.

3. The process of making solutions suitable for lacquers or varnishes and other purposes, which consists in dissolving a fatty acid ester of cellulose in diaceton alcohol substantially as described.

4. The process of making solutions suitable for lacquers or varnishes and other purposes, which consists in dissolving a fatty acid ester of cellulose in diaceton alcohol and a diluent substantially as described.

5. The process of making solutions suitable for lacquers, varnishes and other purposes which consists in dissolving acetyl cellulose in diaceton alcohol, substantially as described.

6. The process of making solutions suitable for lacquers, varnishes and other purposes which consists in dissolving acetyl cellulose in diaceton alcohol and a diluent, substantially as described.

7. The process of making solutions suitable for lacquers, varnishes and other purposes which consists in dissolving acetyl cellulose and nitrocellulose in diaceton alcohol, substantially as described.

8. The process of making solutions suitable for lacquers, varnishes and other purposes which consists in dissolving acetyl cellulose and nitrocellulose in diaceton alcohol and a diluent, substantially as described.

9. The composition of matter comprising diaceton alcohol and dissolved fatty acid ester of cellulose.

10. The composition of matter comprising diaceton alcohol and dissolved acetyl cellulose.

In testimony whereof I affix my signature in presence of two witnesses.

WILLIAM F. DOERFLINGER.

Witnesses:
E. W. SCHEUP,
ALAN C. McDONNELL.